L. S. LACHMAN.

FENCE.

APPLICATION FILED MAY 4, 1910.

Reissued Nov. 29, 1910. 13,176.

WITNESSES:

Allan H. Fraser.

I. Richards

INVENTOR

L. S. Lachman

BY Wm. A. Megrath.

ATTORNEY

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

FENCE.

13,176. Specification of Reissued Letters Patent. Reissued Nov. 29, 1910.

Original No. 917,461, dated April 6, 1909, Serial No. 449,398. Application for reissue filed May 4, 1910. Serial No. 559,417.

*To all whom it may concern:*

Be it known that I, LAURENCE S. LACHMAN, a citizen of the United States, and a resident of the city, county, and State of New York, have invented certain new and useful Improvements in Fences, of which the following is a specification.

This invention relates to fences wherein the longitudinal line-wires or strand wires are united at intervals by transverse metal members forming stays, said stays being provided with means which permit of the same being electrically welded to the strand wires.

The objects of the invention are to provide a fence which permits of the same being rolled up for convenience in transportation and handling and at the same time to provide a fence the stays of which are made of strips of sheet metal so as to stiffen and strengthen the fence where the same is most desired, with a very small increase over the weight of a fence constructed entirely of wire.

Further objects of the invention are to construct a fence at low cost that is neat in appearance and can readily be seen by horses and cattle as the sheet metal stays are easily distinguishable and give great strength to the fence.

Figure 1:
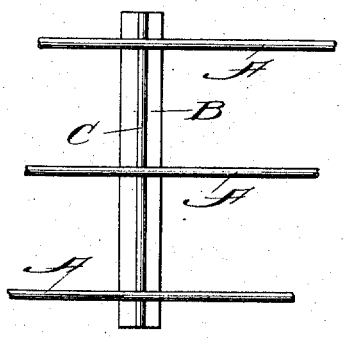
Figure 2:
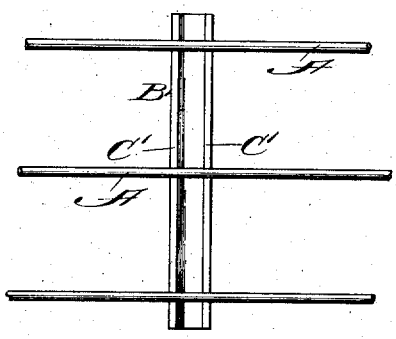
Figure 7:
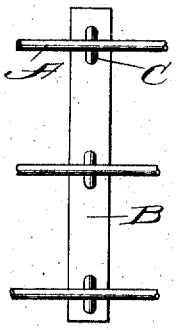
Figure 3:
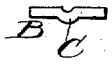
Figure 5:
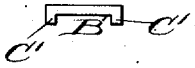
Figure 4:
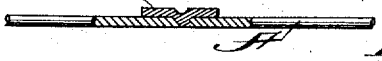
Figure 6:
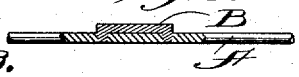
Figure 8:
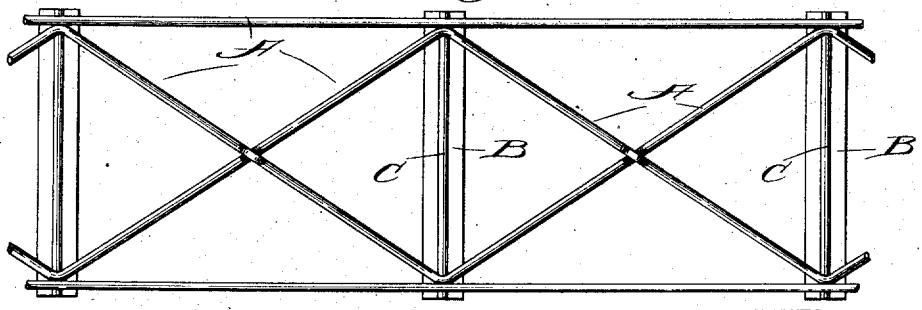

Referring to the drawings: Figure 1 is a front elevation of a portion of a fence constructed according to my invention. Fig. 2 is an alternate form of construction. Fig. 3 is an end view of one of the sheet metal stays used in the construction shown in Fig. 1. Fig. 4 is an end view of Fig. 1, partly in cross section showing the strand wire welded to the sheet metal stay. Fig. 5 is an end view of one of the sheet metal stays used in the construction shown in Fig. 2. Fig. 6 is an end view of Fig. 2 partly in cross section showing the strand wire welded to the sheet metal stay. Figs. 7 and 8 are alternate forms of construction.

Referring to the drawings, in Fig. 1, A designates the strand wires of the fence and B designates the stays which are in the present instance made of strips of sheet metal each of which are provided with at least one ridge C which projects above the surface of the adjacent metal of the stay and corresponds approximately in cross-sectional area to that of the strand wires so that when an electric welding current is passed through the ridge C and the strand wires A and the same are forced together in any desired manner, the metal at the point of contact both on the strand wire and the ridge C will be heated to the welding temperature after which the same are forced together until the metal of the stay and of the strand wire adjacent to the point of welded union meet and contact so as to short circuit the welding current by affording a large path for its passage the metal of the strand wire being welded to the ridge C of the stay B as shown in Fig. 4.

The stays B are usually constructed of sheet metal suitably pressed to form the ridge C although if desired the ridge C may be made in any other desired manner, it being immaterial whether the ridge C is forced up out of the metal, as shown in Fig. 3, or whether the metal is simply rolled to produce a suitable ridge. The stays, if desired, may be provided with more than one ridge and the same may be constructed as shown in Fig. 2, in which an ordinary rolled piece of metal B′ is provided with ridges C′ at each side to which the strand wires are welded as shown in Fig. 6, the operation and process of welding being the same when two ridges are used as when only one ridge is used. When more than one ridge is used it is important that the same should be suitably spaced apart.

It is obvious that if desired, any number of ridges C may be provided, bearing in mind that the same should be spaced a suitable distance apart as before described. It is also obvious that the ridges C and C′ are not necessarily made continuous and can just as well be provided only where the strand wires are to be welded thereto, as shown in Fig. 7, the remaining portion of the ridges being of no advantage in welding the parts together, but of considerable advantage in stiffening the stays, and the ease with which the same can be manufactured, and it is for this the last named reason, that the stays are preferably constructed as shown in Fig. 1 of the drawings. The stays B and B′ can also be made any desired width and size due to this construction, and owing to the stiffness of the stays, due to the ribs with which they are provided and also to their considerable width, the construction described affords many advantages over an ordinary wire fence in which the stays are constructed of wire. If desired the stays can also be welded at different angles to the strand wires so as to further strengthen the fence, as shown in Fig. 8.

While the invention has been described with particular reference to the details of construction it is not to be considered as limited thereto, as many changes may be made and still fall within the scope of the appended claims. Moreover, while the invention has been herein described with particular reference to a fence, it will be noted that it fundamentally discloses the production of a fabric composed of strands of wire, rods or other suitable members and elements connecting said members together and provided with ridges or welding projections at their places of contact therewith, said wires and ridges being weldably united electrically. It will be apparent, therefore, that the invention fundamentally consists of a peculiar correlation of elements whose utility is not essentially confined to fences, and it is to be understood that the invention may be put to other uses than that of a fence, without departing from its spirit.

Having now described my invention, what I claim as new and desire to secure by Letters Patent is:—

1. The combination of a plurality of wires and a plurality of metallic connecting elements therefor, the latter having ridges, said wires and ridges being weldably united.

2. The combination of a plurality of wires and a plurality of metallic connecting elements therefor, the latter having ridges welded to the wires, portions of the wires adjacent to the points of welded union being in contact with but not welded to portions of the connecting elements adjacent to the ridges.

3. The combination of a series of spaced strand wires and a series of spaced metallic ridged connecting elements therefor, said wires and the ridges of the connecting elements being weldably united, the cross sectional areas of the ridges and wires at their places of contact being relatively such that they will reach a melting heat at approximately the same time.

4. The combination of a series of spaced strand wires and a series of ridged stays therefor, said wires and the ridges of the stays being weldably united.

5. A metallic structure comprising a series of wires and a series of ridged metal members, said wires being welded to the ridges of the members.

6. A metallic structure comprising a series of strand wires and a series of ridged metal stays weldably united, the cross sectional area of the ridges and that of the wires being relatively such that they will reach a welding heat at approximately the same time.

7. A metallic structure comprising a series of wires and a series of ridged metal members, said wires being welded to the ridges of the members, the cross sectional area of the ridges being approximately that of the wires, and the metal of the wires adjacent the point of welded union being in contact with but not welded to the adjacent surface of the members.

8. A fence comprising a series of strand wires and a series of ridged sheet metal stays, said strand wires being welded to the ridges of said stays, the cross sectional area of the ridges being approximately that of the strand wires, and the metal of the strand wires adjacent the point of welded union being in contact with but not welded to the flat surfaces of the stays.

9. A metallic structure comprising longitudinally extending round rods, and cross pieces having projections formed thereon to which the said rods are welded.

10. A metallic structure comprising longitudinally extending round rods, cross strips having longitudinally extending ridges, said rods and cross strips being electrically welded at the points of intersection.

11. A metallic structure consisting of a plurality of intersecting members some of the members having welding projections to which the other members are weldably united.

In witness whereof I have hereunto set my hand at the city, county and State of New York, this third day of May, 1910.

LAURENCE S. LACHMAN.

In presence of—

AGNES C. O'CONNELL,
ISABEL R. RICHARDS.